United States Patent [19]

Vogl

[11] Patent Number: 4,867,547
[45] Date of Patent: Sep. 19, 1989

[54] MIRROR OBJECTIVE AND OPTICAL ARRANGEMENT COMPRISING TWO MIRROR OBJECTIVES

[75] Inventor: Georg Vogl, Saltsjöbaden, Sweden
[73] Assignee: U.S. Philips Corporation, New York, N.Y.
[21] Appl. No.: 114,791
[22] Filed: Oct. 28, 1987

[30] Foreign Application Priority Data

Oct. 28, 1986 [SE] Sweden .............................. 8604590

[51] Int. Cl.$^4$ .......................................... G02B 17/00
[52] U.S. Cl. .................................................. 350/444
[58] Field of Search .................. 350/444, 6.1; 356/331

[56] References Cited

U.S. PATENT DOCUMENTS 2,378,301 6/1945 Kaprelian ............................ 350/444
3,930,728 1/1976 Pieuchard et al. .................. 356/331
4,226,500 10/1980 Minoura et al. ..................... 350/6.1

Primary Examiner—Bruce Y. Arnold
Assistant Examiner—Rebecca D. Gass

[57] ABSTRACT

A primary mirror and a secondary mirror are arranged on a lens to form an eccentric radiation path through the mirror objective. The optical axis of the mirror objective follows an N-shaped path through the objective and central diaphragming is avoided. The object and consequently the image are situated outside the geometrical axis of the mirror objective, which shows a short distance between the object and the image. In an optical arrangement comprising two such mirror objectives, one is used for illuminating and the other is used for imaging.

5 Claims, 1 Drawing Sheet

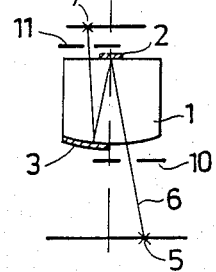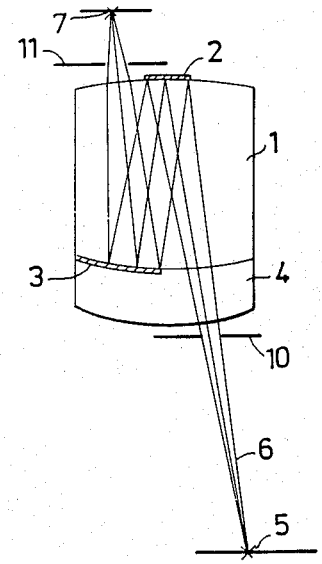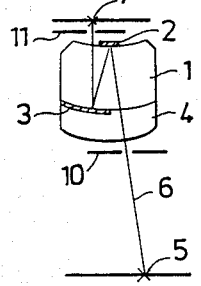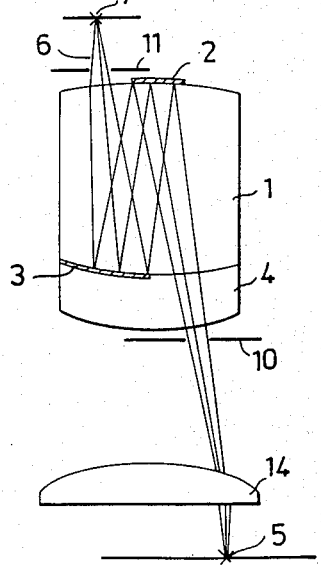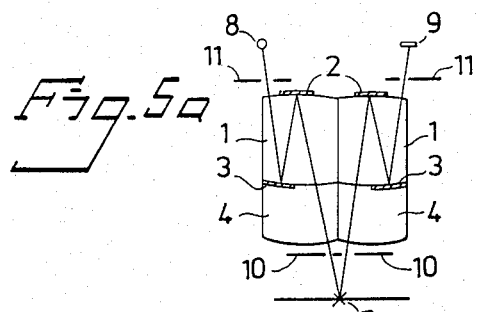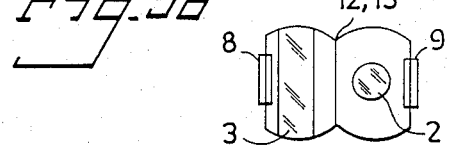

MIRROR OBJECTIVE AND OPTICAL ARRANGEMENT COMPRISING TWO MIRROR OBJECTIVES

BACKGROUND OF THE INVENTION

The invention relates to a monolithic mirror objective comprising a lens having a primary mirror on the output surface of the lens and a secondary mirror on the input surface of the lens to form an N-shaped radiation path through the mirror objective. In this case all of the N-shaped radiation path is within the lens and possible further lenses. The invention also relates to an optical arrangement comprising two such mirror objectives.

All standard mirror objectives consist of a primary mirror and a secondary mirror, which may be disposed in connection to one or a number of combined lenses. U.S. Pat. No. 2,378,301 shows such a mirror objective in the form of a camera objective. In a mirror objective of the prior art, the primary mirror images the object in its focal plane, the rays are caught by the secondary mirror and the rays are reflected through an aperture in the primary mirror and into the image plane of the camera of the field glass. The optical axis of the mirror objective coincides with the geometrical axis of the objective which passes through the central part of the objective. The aperture in the primary mirror causes a central obscuration on the entrance pupil of the objective (diaphragming in the centre), that is to say, light cones emanating from each object point become hollowed. In order to reach a given desired strength of light, the outer rays of the cone must be given a large angle with respect to the geometrical axis of the mirror objective. Furthermore, if it is desired to adapt the mirror objective to a small magnification, the diameter of the secondary mirror increases and hence the angle of outer rays increases further. When transferring symbols from a material of, for example, paper to a detector, such an objective is unusable because a depth movement of the material which may be very small results in an unacceptable defocus.

SUMMARY OF THE INVENTION

It is an object of the invention to use the advantages of mirror optics over lens optics, namely to obtain the same image quality and short length of the construction by using fewer elements whilst avoiding the great disadvantage of the mirror objective, namely the central diaphraming. This is obtained by putting the object and consequently the image outside the geometrical axis of the mirror objective. The optical axis is reflected between the mirrors as an N and there is no need for an aperture in the primary mirror. The imaged radiation beam assumes the same appearance as with a lens objective and the depth of focus will only be dependent on the entrance pupil and the object distance.

According to the invention the first mirror is arranged to cover the central part of the output surface, while the second mirror is arranged to cover a part of the input surface which is displaced aside relative to the center of the input surface, so that the first mirror and the second mirror together with the lens and possible further lenses can follow an eccentric, N-shaped path through the objective, the object and the image situated on each side of the geometrical axis of the mirror objective.

The mirror objective according to the invention is suitable for reading bar symbols, letters and digits having one detector line (array) and for reading optical discs and similar storage media. Until now a microobjective or a miniaturized photo objective have been used in connection with the examples of application. These objectives, however, have inconvenient dimensions. For example, in order to transfer a letter having a size of 10 mm to a detector having a size of 5 mm an astigmate having four lenses is needed and an overall length from the object to the detector of 40 to 60 mm. This length may be compared with the overall length of at least 20 mm in connection with the mirror objective according to the invention.

In its simplest form the mirror objective consists of two reflecting surfaces applied to a lens. In order to improve the image sharpness and adapt the mirror objective to different magnifications (the ratio of the object and the image dimensions), however, further lenses may be disposed which are preferably glued together with the lens. According to an advantageous embodiment of the mirror objective a further lens is disposed adjacent to the lens, one of the reflecting surfaces being enclosed between the two lenses.

According to another advantageous embodiment a collimator lens is disposed near the object. The collimator lens ensures that radiation beams which are mutually parallel are chosen for imaging. If the variations of the object distance are small, the image dimension by means of this arrangement remains unchanged. The mirror objective according to this embodiment is characterized in that a collimator lens is disposed near the object plane of the mirror objective.

The invention also relates to an arrangement comprising two mirror objectives according to the invention. One of the objectives is used for illuminating, while the other is used for reading. Normally the illuminating is carried out by means of a miniature lamp or a so called vertical illuminator. In the first case a large field is illuminated but only a narrow strip is used for reading. In the other case the light is reflected in an inclined transparent mirror, passes the objective and illuminates the object, the object being imaged by the objective by means of the mirror on the detector. Both of these illuminating systems require a lot of light and a great deal is lost and may also give rise to disturbing reflections. The eccentric radiation path causes the object to be situated at the periphery of the optics. Accordingly, two identical mirror objectives may be situated adjacent to one another and one of them may be used for projecting a light source on the object, which light source is shaped in accordance with the object, for example, a straight incandescent filament, if a line or a band on the object is to be read. The radiation paths for illuminating and reading are totally separated in this case, whilst no reflections occur and only the field to be read is illuminated.

The optical arrangement consisting of two mirror objectives is characterized in that the two mirror objectives are arranged with two parallel geometrical axes and adjacent to each other, and in that one of the mirror objectives is used for illuminating an object, while the other mirror objective is used for imaging the object in question.

BRIEF DESCRIPTION OF THE DRAWING

FIG. 1 shows a simple embodiment of a mirror objective,

FIG. 2 shows a second embodiment of a mirror objective according to the invention comprising one further lens, FIG. 3 shows a third embodiment of the mirror objective according to the invention, FIG. 4 shows a fourth embodiment of the mirror objective according to the invention comprising a collimator lens, and FIG. 5a is a side view an optical arrangement comprising two mirror objectives;

FIG. 5b is a top view of the arrangement show in FIG. 5a.

DETAILED DESCRIPTION OF THE PREFERRED EMBODIMENT

The mirror objective of FIG. 1 consists of a planoconvex lens 1 provided with a primary mirror 2 and a secondary mirror 3. The object 5 is imaged by means of a radiation beam 6 on the detector or the detector line 7. In the Figure only the radiation path of the central ray is indicated. An input slot 10 is disposed between the object 5 and the lens 1 and an output slot 11 is disposed between the lens body 1 and the detector line 7. The mirror objective according to FIG. 1 is suitable for a magnification of 0.5. The magnification is not limited to this value, but it may assume other values, preferably by changing the refractive index. The lenses mentioned above and below are preferably of synthetic resin or glass material.

In the following description with reference to FIGS. 2-4 corresponding elements have been given the same reference numerals as in FIG. 1.

In addition to the lens 1, which in this case is convex, the embodiment shown in FIG. 2 comprises a further lens 4. These two lenses 1, 4 are disposed in such a way that the secondary mirror 3 is enclosed by the adjacent surfaces of the lenses. The second surface of the lens 4 facing the input slot 10 has a spherical shape permitting the radiation beam 6 to hit the last-mentioned surface at an essentially right angle.

FIG. 3 shows an embodiment in which the lens 1 is convex-concave and a further lens 4 is arranged to enclose the secondary mirror 3 together with the convex surface of the lens 1. As in FIG. 1, only the radiation path of the central ray is indicated.

FIG. 4 shows a mirror objective according to FIG. 2 which is provided with a collimator lens 14 close to the object. The collimator lens shows that radiation beams being mutually parallel are selected for the imaging.

An optical arrangement consisting of two mirror objectives of the above described kind is shown in FIGS. 5a and 5b. The two mirror objectives, the bodies, are disposed adjacent to each other and one of them (on the left) is used for illuminating an object 5, while the other one (on the right) is used for imaging the object 5 in question. The illuminating body as well as the imaging body each consist of a convex lens 1 and a further lens 4 which together enclose a secondary mirror 3, and a primary mirror 2 arranged in connection to the convex lens 1. Furthermore the bodies are provided with input and output slots 10, 11. The reference numeral 8 denotes a light body whose light is projected onto the object 5 and is then imaged on the detector line 9. As is shown in FIG. 5b the aperture of the primary mirror 2 in the illuminating body, the mirror objective on the left, may be larger than the primary mirror 2 in the imaging body, the mirror objective on the right. In the embodiment according to FIG. 5, the adjacent surfaces of the illuminating body and the imaging body consist of flat surfaces 12, 13. However, as in the case of the optical mirror systems described with reference to FIGS. 1-4, the bodies may be circular cylindrical. The object 5 is disposed in alignment with the flat surfaces 12, 13 in the embodiment shown.

What is claimed is:

1. An optical arrangement having a mirror objective for imaging a planar object onto an image plane, comprising
   a lens having an input surface toward the object, an output surface toward the image plane, and a geometric axis extending between said surfaces,
   a primary mirror arranged on the output surface and centrally located on the geometric axis,
   a secondary mirror on the input surface and displaced from the geometric axis so that the first and second mirrors together with the lens establish an eccentric N-shaped radiation path, the object and the image being situated on opposite sides of the geometric axis.

2. An optical arrangement as claimed in claim 1, characterized in that an input slot is disposed in front of the input surface and an output slot is disposed after the output surface in order to together with the shaping of the mirrors delimit the radiation beam passing through the mirror objective.

3. An optical arrangement as claimed in claim 1, characterized in that a further lens is disposed adjacent to said lens, one of the reflecting surfaces being enclosed between the two lenses.

4. An optical arrangement as claimed in claim 1, characterized in that a collimator lens is disposed near the object plane of the mirror objective.

5. An optical arrangement as claimed in cliam 1, having the further including a second mirror objective said two mirror objectives arranged with parallel geometrical axes and adjacent to each other, and in that one of the mirror objectives is used for illuminating the object while the other mirror objective is used for imaging the object.

* * * * *